UNITED STATES PATENT OFFICE.

HENRY S. WILLIAMS, OF NEW HAVEN, CONNECTICUT.

PHOTOGRAPHIC PROCESS.

SPECIFICATION forming part of Letters Patent No. 640,060, dated December 26, 1899.

Application filed October 9, 1899. Serial No. 733,025. (No specimens.)

*To all whom it may concern:*

Be it known that I, HENRY S. WILLIAMS, of New Haven, in the county of New Haven and State of Connecticut, have invented a new and Improved Photographic Process; and I do hereby declare the following to be a full, clear, and exact description of the same.

My invention relates to an improved photographic process, the object being to eliminate the disturbing factors of unequal reflection due to variations of color and variations in the reflecting properties of the surface, whereby the configuration of the surfaces being photographed is made dependent purely upon lights and shadows.

My invention, as I may further state, is particularly well adapted for photographing small objects, such as fossils, in which the scientific value of the photograph depends upon the accuracy of the reproduction of their topographical or surface contours.

With these ends in view my invention consists in a photographic process comprising the deposition from vapor of a temporary opaque film on the surface of an object to be photographed, the film being of a character which removes itself by dissipation or which may be manually removed without injuring the surface of the object, however delicate.

In explaining the character of the process and the mode of procedure the photographic reproduction of a small fossil in a fragment of stone may be described, and it may be supposed that the fracture of the stone reveals partly embedded in it the fossil, which or portions of which are embedded in very low relief above the main surface of the stone. Here it will be seen that I have chosen for illustration the instance of a fossil embedded in a fragment of stone; but the illustration will hold true if it be supposed that the stone represents the fossil by occupying the precise place where the fossil was once, just as the imprint of a foot in mud becomes filled with stone which represents the form of the foot. Preparatory to photographing such an object it has deposited upon it by sublimation from vapor a temporary opaque film of such extreme tenuity that while it suppresses variations in the color of the object and variations in the reflecting properties of the surface of the object conforms to the minutest variations in the surface contours of the object, so that surface contours so slight as hardly to be perceived by the eye are perfectly conformed to by the film. Now when the object is photographed in the ordinary way the surface is reproduced with absolute fidelity with such a sharp reproduction of its minutest variations in surface contour that when magnified all of these variations reappear and enable the object to be studied from the photograph as well as from the original. Without going into the subject further, it may be said that this opaque film eliminates not only the distorting effects of variations in the color of the object due to various actinic powers of those colors, but also eliminates the disturbances due to the reflections of minute crystals in the stone itself due to its complex composition. As a simple illustration, if the fossil occurs in a sandstone containing minute particles of mica those particles in being photographed reflect the light so as to obscure, complicate, and distort the accuracy of the photograph, these disturbing factors being conspicuous when the photograph is magnified. It will be obvious that the film not only suppresses these minute reflections and disturbances, but also suppresses any high lights on the object by equalizing the reflecting-surfaces. After the object has been photographed the film dissipates itself, going off in the form of vapor at ordinary or slightly-raised temperatures, or it may be removed artificially by dusting, so to speak, the object with a brush of such delicacy as not to disturb the surface of the object, which is thus left with absolutely no impairment of its surfaces.

In the employment of my process I may use a variety of substances for the production of the vapor from which the opaque film is obtained, whether those substances be classified as organic or inorganic. Thus I have obtained excellent results by the employment of the vapor of ammonium chlorid, which deposits by sublimation an extremely tenuous pure white film composed of crystals so microscopic that the surface produced has the appearance of being amorphic; but I do not limit myself to the employment, as aforesaid, of any one substance, as there are a variety of substances which I may choose from, such as naphthalene, benzoic acid, camphor, and so on.

Although I have described my process in connection with the photographic reproduction of a fossil, it is apparent that the process may be utilized for photographing a great variety of objects where for scientific accuracy it is desired to eliminate the disturbing factors of variations in color and reflecting properties of the surface. Thus the process might be used with great advantage in the illustration of works on conchology, where it is desired to reproduce with accuracy different kinds of shells, which almost always contain variations of color and texture. Coins, medals, and other works of art may also be photographed with advantage in this way. I would therefore have it understood that I do not limit myself to the employment of the particular substances shown or to the utilization of my invention in the instances specified, but hold myself at liberty to make such uses of my invention as fairly fall within its spirit and scope. I am aware, however, that it is old to prepare surfaces for photographing them by mechanically coating them with some material like chalk-dust or whitewash.

Having fully described my invention, what I claim is—

A photographic process consisting in the deposition by sublimation from vapor of a temporary opaque film of extreme tenuity on the surfaces of the object to be photographed, the film being of a character which removes itself by dissipation, or which may be manually removed without injuring the surface of the object.

In testimony whereof I have signed this specification in the presence of two subscribing witnesses.

HENRY S. WILLIAMS.

Witnesses:
 FRED C. EARLE,
 LILLIAN D. KELSEY.